(No Model.) 6 Sheets—Sheet 1.

F. H. RICHARDS.
WEIGHING MACHINE.

No. 600,028. Patented Mar. 1, 1898.

Witnesses:
Chas. D. King,
Fred. J. Dole.

Inventor:
F. H. Richards.

(No Model.) 6 Sheets—Sheet 2.

F. H. RICHARDS.
WEIGHING MACHINE.

No. 600,028. Patented Mar. 1, 1898.

Witnesses:
Chas. D. King,
Fred. J. Dole.

Inventor:
F. H. Richards.

(No Model.)  F. H. RICHARDS.  6 Sheets—Sheet 3.
WEIGHING MACHINE.

No. 600,028.  Patented Mar. 1, 1898.

Witnesses:
Chas. D. King.
Fred. J. Dole.

Inventor:
F. H. Richards.

(No Model.) 6 Sheets—Sheet 4.

F. H. RICHARDS.
WEIGHING MACHINE.

No. 600,028. Patented Mar. 1, 1898.

Witnesses:
Chas. L. King,
Fred. J. Dole.

Inventor:
F. H. Richards.

(No Model.)  6 Sheets—Sheet 6.

F. H. RICHARDS.
WEIGHING MACHINE.

No. 600,028.  Patented Mar. 1, 1898.

Witnesses:
Chas. D. King.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,028, dated March 1, 1898.

Application filed July 26, 1897. Serial No. 645,973. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of this character more especially intended for automatically weighing and delivering stalky and fluffy substances—such as sugar-cane, hay, cotton, &c.

Figure 1:
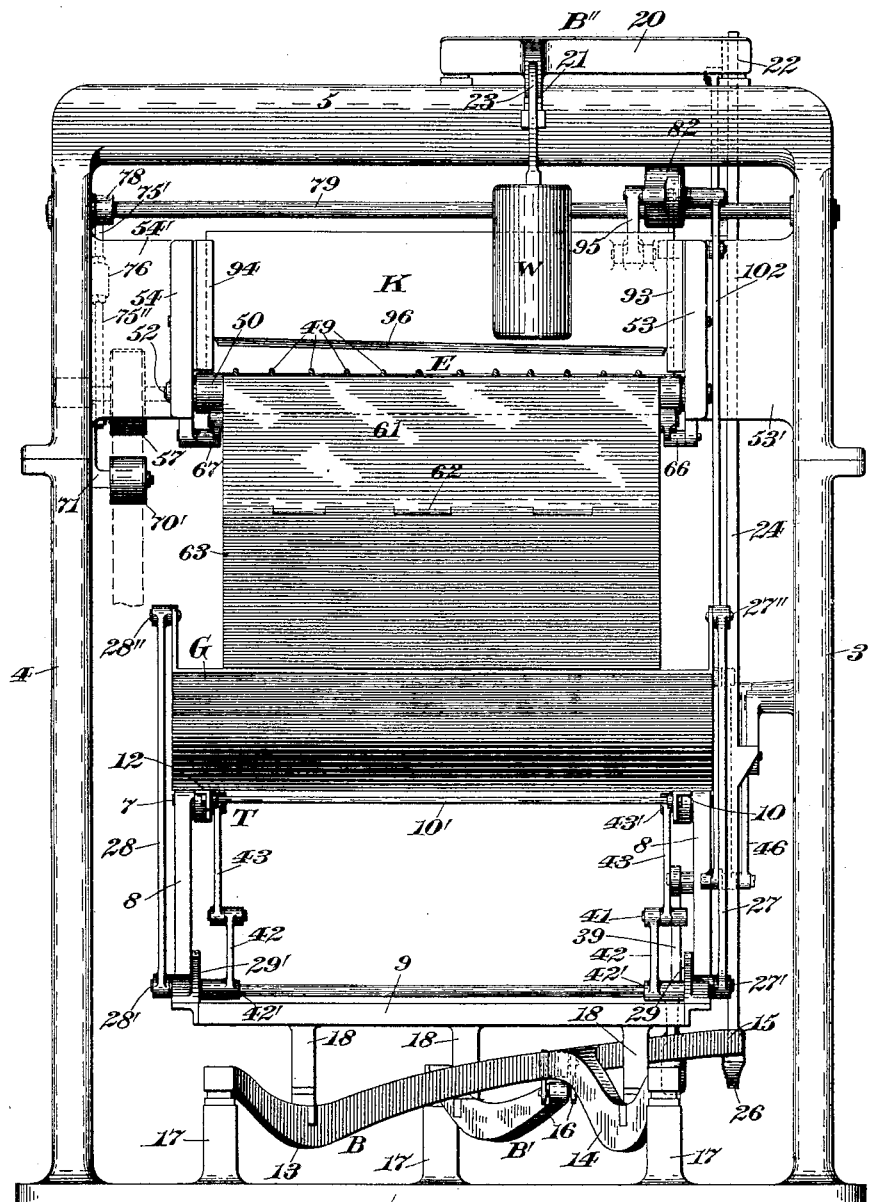
Figure 2:
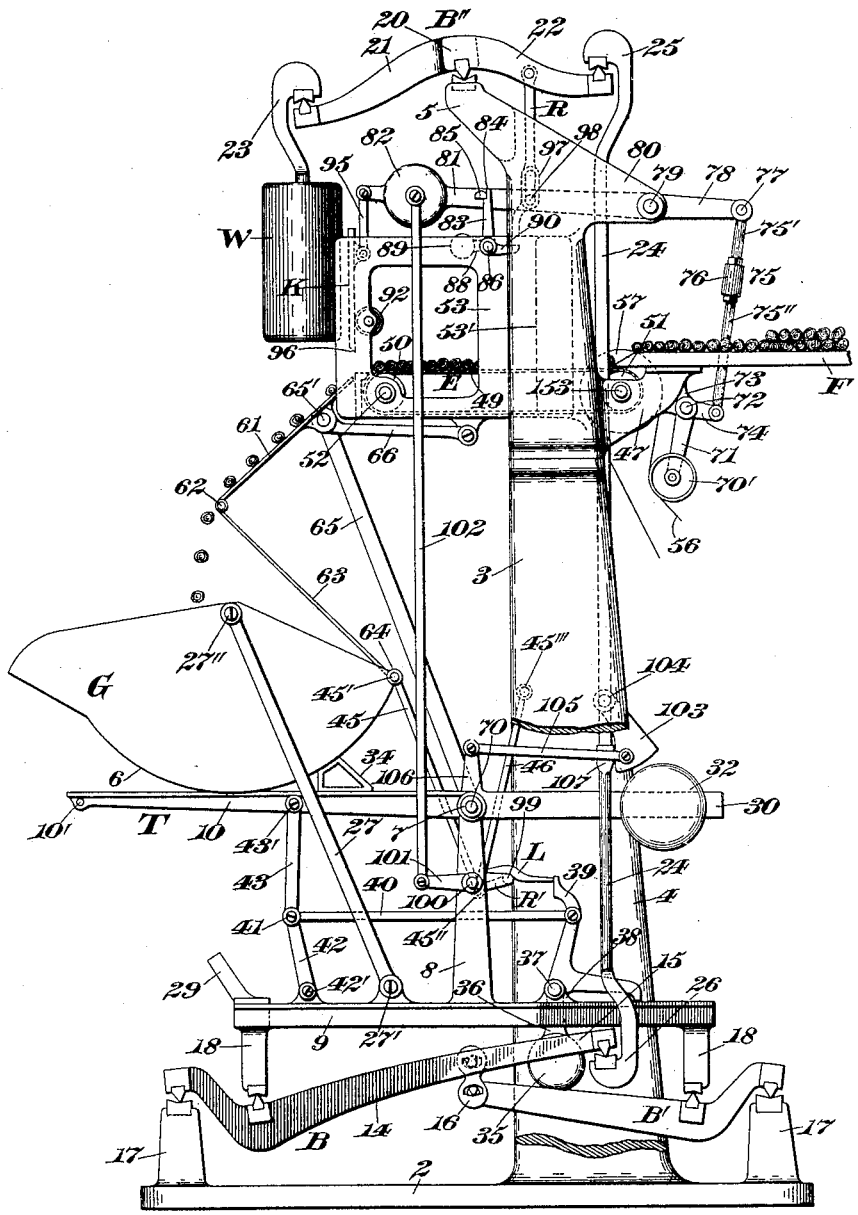
Figure 3:
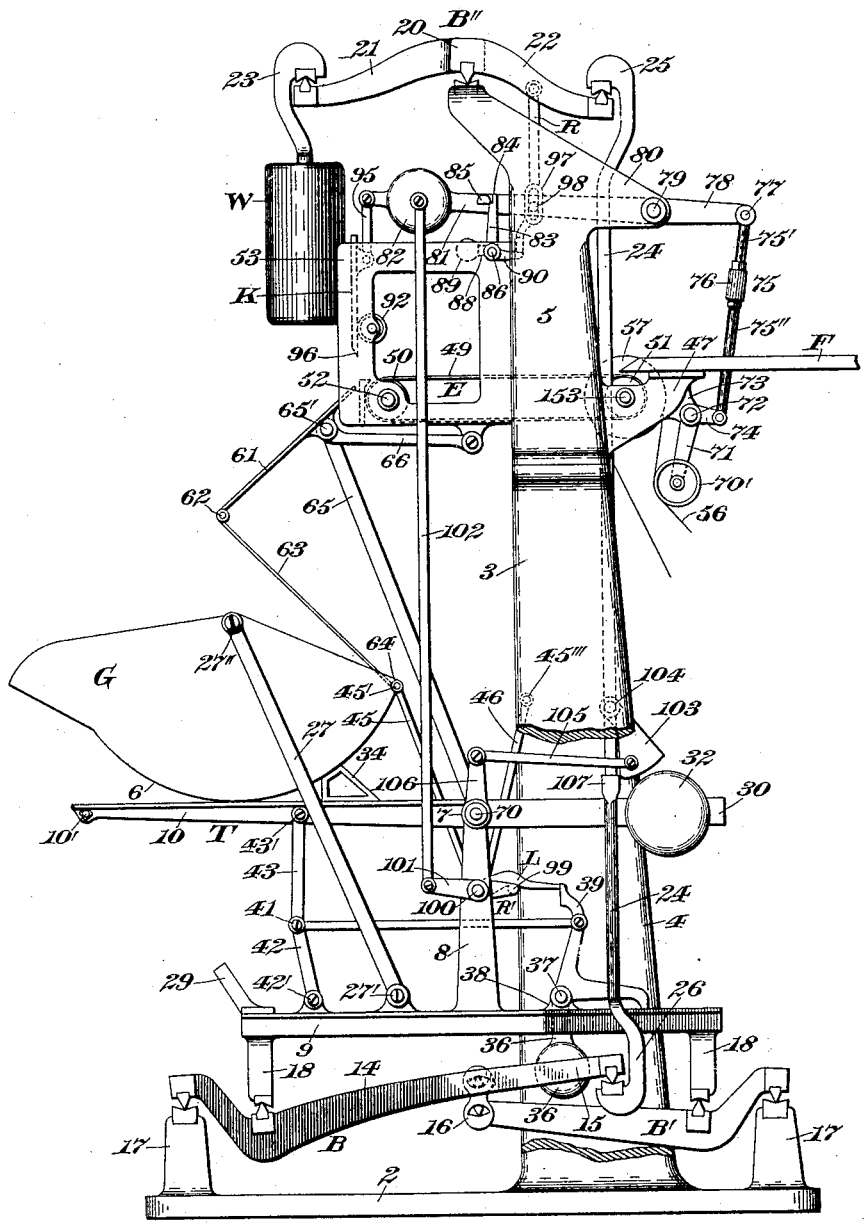
Figure 4:
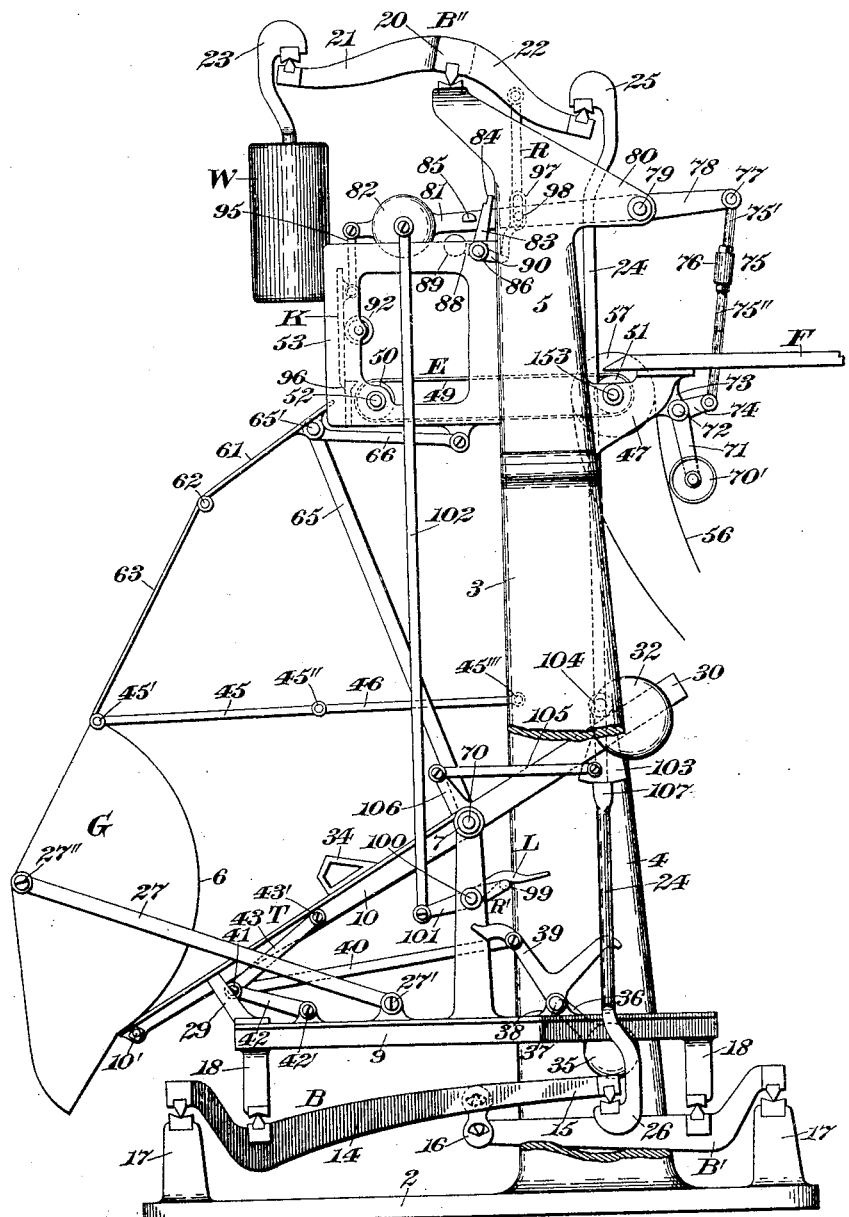
Figure 5:
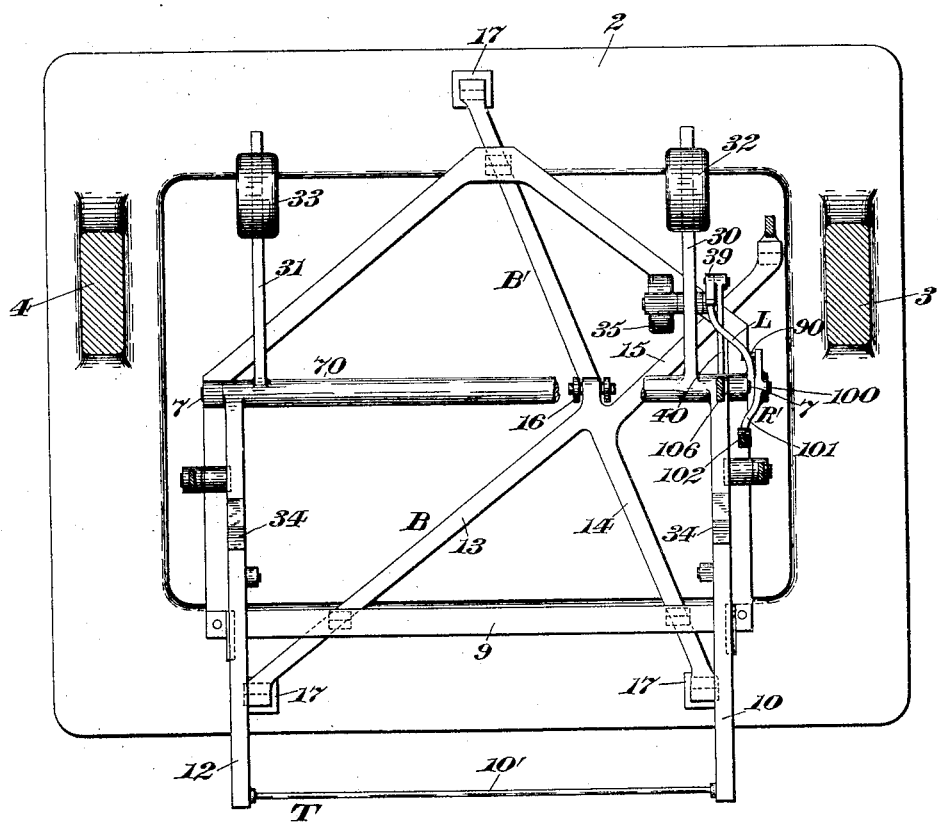
Figure 6:
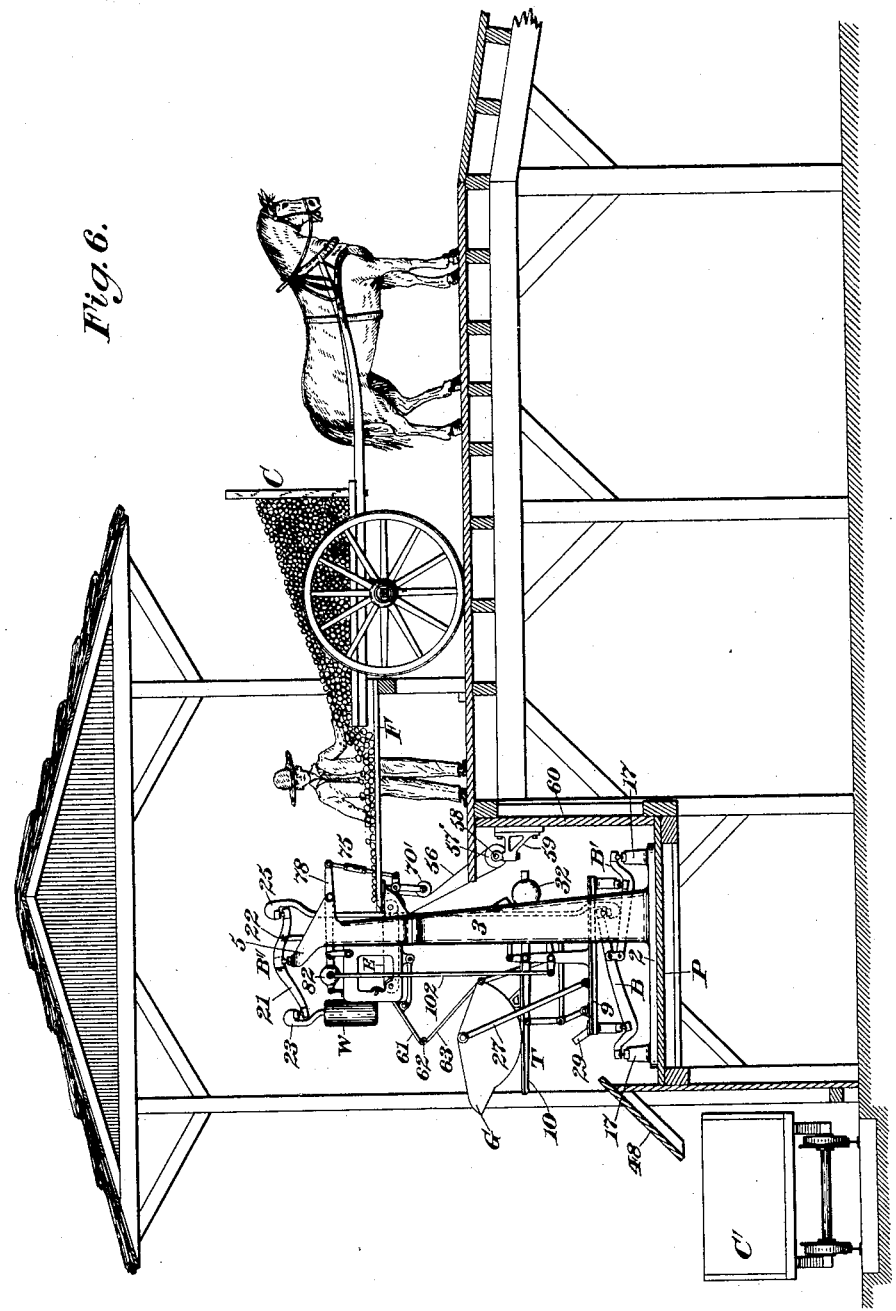

In the drawings accompanying and forming part of this specification, Figure 1 is a front elevation of my improved weighing-machine. Figs. 2, 3, and 4 are side elevations of the same as seen from the right in Fig. 1, showing the positions assumed by the different parts during the making and discharging of a load. Fig. 5 is a sectional plan view of the means for supporting the load-receiver, including a portion of the beam mechanism; and Fig. 6 is a view similar to Figs. 2, 3, and 4, showing the machine on a smaller scale and a mode of mounting and using the same.

Similar characters designate like parts in all the figures of the drawings.

The framework for sustaining the various parts of the machine may be of any suitable construction. It is represented consisting of the apertured base-plate 2, the columns or standards 3 and 4, rising therefrom, and the beam 5, joining the standards 3 and 4 at the top.

The weighing mechanism embodies a load-receiver and beam mechanism therefor.

The beam mechanism in the present case consists of two systems composed, respectively, of a series of platform-supporting beams or levers, and a weigh-beam provided with counterpoising means for the load-receiver, the latter being supported, but not directly, upon the series of platform-beams, as will hereinafter appear.

The load-receiver is designated by G, and it is in the form substantially of a cradle or rocking receptacle supported for rolling movement upon a track or equivalent support, as T, the track-engaging portion 6 of the load-receiver being preferably curvilinear. The track is preferably movably mounted, it being pivotally supported, as at 7, upon the posts or risers 8, situated at opposite sides of the skeleton frame or platform 9. The track or support T consists of the two sections 10 and 12, along which the load-receiver rolls, (see Fig. 5,) joined at the front by the tie-bar 10'. The pivot 7 for sustaining the track T consists of a rock-shaft, to which the track-sections 10 and 12 are secured, it being journaled in the posts 8 upon the skeleton frame 9.

The frame 9 is supported upon a pair of beams B and B', respectively, the beam B consisting of three arms and the beam B' of one. The beam B' is connected with the beam B at about the point of junction of the three arms 13, 14, and 15, a link, as 16, of ordinary construction, being furnished to tie the two beams, the connection being a knife-edge and notch-bearing one common in this art. The beams B and B' are furnished with depending knife-edges mounted upon notched bearings secured in the upper ends of the equidistantly-disposed risers 17 on the base 2. The platform 9 is furnished with the equidistantly-disposed hangers 18, carrying the usual knife-bearings at their lower ends working against coöperating knife-edge pivots secured to the two beams.

The weigh-beam is designated by B'', and it consists of a transverse portion 20 and the oppositely-disposed arms 21 and 22 thereon, the arm 21 constituting a means for supporting the counterpoising means or weight W. The weight W has a hook 23, connected by a knife-edge and notch bearing-joint with the beam-arm 21. The weight-beam B'' is connected with the beam B by the rod 24, having hooks 25 and 26 at its opposite ends connected by a knife-edge and notch bearing-joint with the beam-arms 22 and 15.

The load-receiver G is mounted, preferably, for rolling movement directly upon the track T, the latter being supported for tilting movement by the posts 8.

A pair of links is shown at 27 and 28, the links being pivoted at their lower ends, as at 27' and 28', to the platform 9, and at the upper ends, as at 27'' and 28'', to the upper side of the rolling load-receiver G. The track or support T is normally held against movement, as will hereinafter appear. When it is released, which takes place on the completion of a load, the weight of material in the receiver will bear the forward end of the track down, so that by reason of the connection between the load-receiver and the stationary platform 9 through the guide-links or rods 27 and 28 the load-receiver G will be caused to roll along the track T, whereby its lower edge will be depressed, as represented in Fig. 4, to cause the contents of the load-receiver to pass therefrom.

A pair of stops is shown at 29 and 29', respectively secured at the opposite sides and front of the platform 9 and disposed in the path of movement of the track T to prevent the latter from tilting too far, as shown in Fig. 4.

The rearwardly-extending arms 30 and 31 of the load-receiver support T are furnished with the balance-weights 32 and 33. The rearward movement of the load-receiver is limited by the stops 34, secured to the upper sides of the track-sections 10 and 12. For returning the load-receiver to its primary position on the discharge of a load a gravity device, such as the weight 35, is furnished, the latter being secured to the arm 36 on the rock-shaft 37, journaled in the lugs 38 on the platform 9. The shaft 37 is provided with the substantially vertical arm 39, engaged by a latch, as L, during the normal operation of the machine to hold the load-receiver and its track. The arm 39 has pivoted thereto the link 40, likewise connected, as at 41, to the toggle-links 42 and 43, pivoted, as at 42' and 43', to the platform 9 and track T. It will be understood that when the latch L is in engagement with the arm 39 the platform T and load-receiver G will be held against action by reason of the intermediate connections just described. When the load-receiver G is lowered on the tripping of the latch L, the weight 35 will be shifted, as shown in Fig. 4. When the load is emptied from the receiver G, the weight 35, acting through the arm 39 and link 40, will throw the pivotal points 41', 42', and 43' into line, thereby to elevate the track T, and consequently the load-receiver G, to receive a new charge.

The load-receiver G is connected with the side frame 3 by a toggle consisting of the members 45 and 46, pivoted at 45', 45", and 45''' to each other and to the load-receiver and side frame 3, respectively, the construction being such that when the load-receiver is tilted to discharge its contents the toggle acts as a lock to hold the same in its discharging position. The weight 35 acts as a means for throwing the several toggle-pivots out of line to release the load-receiver.

My improved machine is adapted for weighing various kinds of substances, it being represented in Fig. 6 as weighing sugar-cane, which is collected from the fields in carts, as C, and delivered by them to the feed-board F, secured by suitable means to the upper flat faces of the brackets 47, extending rearward from the side frames 3 and 4, the material being pushed on the feed-board from the cart by an attendant.

In Fig. 6 the weighing-machine is represented as mounted upon the platform P, and the load-receiver G empties its contents onto the inclined board 48, from which they pass into the car C' or other receptacle to be disposed of as occasion requires.

Any suitable means may be furnished for supplying the load-receiver G with material to build up the load. I have represented an endless conveyer E for this purpose, consisting of a plurality of properly-spaced ropes or bands 49, passed around the supporting-rolls 50 and 51, respectively. The shaft 52 of the front roll 50 is journaled in the extensions 53 and 54, projecting forward from the wing-pieces 53' and 54' on the inside of the side frames 3 and 4, respectively. The shaft 153 of the rear roll is journaled in the brackets 47.

The driving mechanism for the conveyer in the present case comprehends as a part thereof a belt 56, passing around a pulley or wheel 57 on the rear shaft 153 of the conveyer E, and also around a power-transmitting device, as the pulley 57', the shaft 58 of which is supported by a bracket 59 on the wall 60, (shown in Fig. 6,) the shaft 58 being connected in some convenient manner with a motor. (Not shown.)

The material is pushed by an attendant from the feed-board F onto the supply-conveyer E, as shown in Figs. 2 and 6, from which it passes to the apron or guide 61 on the weighing mechanism, whose width is substantially the same as the conveyer, the stalks falling onto the apron and then into the load-receiver until the load is completed, at which time the supply is stopped, preferably by throwing the feed-conveyer out of action.

The lower end of the apron 61 is hinged, as at 62, to the link or belt 63, pivoted at 64, at its lower end, to the rear side of the load-receiver G. The apron is upheld by the longitudinal rod 65, pivoted thereto, as at 65', and loosely connected at its lower end to the transverse rock-shaft 70. The apron is also connected with the framework by the guide-links 66 and 67.

In connection with the feed-conveyer driving-belt 56 I have provided a pressure device normally acting against the belt to tighten it, whereby the conveyer E can be driven, means being provided on the completion of a load for moving said pressure device away from the driving-belt, thereby to loosen the same for stopping the conveyer.

The pressure device is designated by 70', and it consists of a roll acting against the belt 56 and pivoted to the arm 71, whose pivot 72 is fixed to the lug 73 on the framework. It will be apparent that when the pressure device is moved away from the belt 56 the latter will be loosened to such an extent, as shown in Fig. 4, as to stop the conveyer E. The pivot 72 has affixed thereto the arm 74, connected, through the link 75, with which it is pivoted, to suitable operating means for the pressure-roll 70'.

The link 75 is in two parts, 75' and 75'', connected by a turnbuckle 76 in the usual manner, so that the length of the link can be regulated by manipulating the turnbuckle. The upper end of the link 75 is pivoted, as at 77, to the rock-arm 78 on the rock-shaft 79, whose opposite ends are journaled in the bearings 80 on the side frames 3 and 4. The shaft 79 is furnished with the forwardly-extending arm 81, which in the present case carries an actuator for the pressure-roll 70', the actuator consisting of the gravity device or weight 82. The actuator or weight 82 is normally held ineffective by a suitable detent, such as the arm 83, whose shouldered upper end 84 is adapted to engage the projection 85 on the arm 81, as shown in Fig. 2, the detent 83 being pivoted, as at 86, to the extension 53 of the side frame. The detent 83 is furnished with the horizontal counterweighted arm 88, whose weight 89 serves to hold the arm 83 in engagement with the projection 85. The pivot 86 of the detent 83 has secured thereto the arm 90, disposed in the path of movement of a tripper, as will hereinafter appear. It will be evident that when the detent 83 is disengaged from the projection 85 the weight 82 can drop, thereby lifting the arm 78 and moving the pressure-roll 70' away from the driving-belt 56.

In connection with the supply-conveyer I preferably provide a knife, serving as a valve, to positively cut off the supply to the apron 61, which is mounted on the weighing mechanism, and hence to the load-receiver itself, it being understood that the momentum of the conveyer generally carries material into a loaded receiver unless a stop is provided to prevent such action. The knife is designated by K, and it is vertically disposed, it being guided between the antifriction-rollers 92, disposed on the forward extensions 53 and 54 and the overhanging flanges 93 and 94 on said extensions. The knife K is pivoted near one corner to the link 95, connected at its upper end to the arm 81, which, it will be remembered, is provided with the actuator or weight 82. When the latch or detent 83 is tripped, the knife K is released and the weight 82 is free to drop, whereby the latter will force the knife rapidly downward with its cutting edge 96 through the substance supported near the forward end of the conveyer E, whereby the material is positively held back from entering the load-receiver.

The tripper or releasing device for the detent 83 is designated by R, and it consists of a link pivoted at its upper end to the beam-arm 22, and furnished intermediate its extremities with the guide-loop 97, embracing the guide-pin 98 on the arm 81, the parts being so disposed relatively to each other that the lower or free end of the link or tripping device R will impinge against the arm 90 just prior to the completion of the load, so that when the load is completed the arm or detent 83 will be disengaged from the projection 85, thereby allowing the weight 82 to drop to move the pressure-roll 70' away from the driving-belt 56 and simultaneously to move the knife K through the substance situated near the forward or delivery end of the conveyer E.

For tripping the latch L the tripper R' is furnished, it consisting of an arm provided at its rear end with the projection 99, upon which the latch or detent L normally rests, said arm being affixed to the short rock-shaft 100, journaled in the post 8. The shaft 100 carries the forwardly-extending arm 101, to which the rod 102 is pivoted, the rod being likewise attached at its upper end to the weight 82. When the weight 82 drops in the manner hereinbefore described, the arm or tripping device R', and consequently the latch L, is elevated, and the latter moved to a point above the coöperating arm 39, thereby to release the load-receiver G.

Means are preferably provided in connection with the load-receiver to prevent the ascent of the beam mechanism during the discharge of a load, such means consisting in the present case of a stop 103, in the form of a segmental blade, pivoted, as at 104, to the side frame 3, and pivoted near its lower end to the link 105, the opposite end of which is likewise attached to the vertical arm 106 on the tilting platform. The stop 103 coöperates with the stop 107 on the rod 24, the stops being reciprocally effective, as will be apparent. During the major period of operation the stop 103 will bear against the coöperating stop or shoulder 107, so that if the latch L should be tripped too soon the load-receiver and other parts cannot tilt, the stop 107 serving as a bar to block such action until the upper face of the stop has crossed the arc of oscillation of the stop 103, at which time the latch L can be tripped, or, having been tripped, the load-receiver G and track T can be lowered. When the track T tilts, as shown in Fig. 4, the stop 103 is swung across the path of vertical movement of the shoulder or stop 107, so that the rod 24, and consequently the weighing mechanism, cannot rise, the stop 103 serving to preclude such action.

The operation of the hereinbefore-described machine, briefly set forth, is as follows: Figs. 2 and 6 show the positions occupied by the respective parts at the commencement of the operation, the load-receiver being empty and held in its initial position by the latch L, which is in engagement with the arm 39. The conveyer E being in motion the stalks will be fed to the apron 61 on the weighing mechanism and from thence drop into the load-receiver G, which with its track T and platform 9 and with the several beams B B' B'' are lowered. The parts continue to descend until the tripping device R, connected with the beam-arm 22, strikes the latch-arm 90, which indicates the completion of a load, so that the arm 83 is disengaged from the projection 85, thereby releasing the weight 82, so that the arm 81 drops, the arm 78 thereby being elevated and acting, through the intermediate and hereinbefore-described connections, to shift the roll 70' away from the driving-belt 56 to stop the feed-conveyer E, the knife K being simultaneously forced through the substance near the forward end of the feed-belt to prevent its entrance into the loaded receiver. When the weight 82 drops, the rod 102 will be forced downward, thereby acting, through the intermediate devices, to lift the latch L above the upper end of the arm 37, thereby releasing the tilting track, so that it can be swung down by the weight of the mass in the receiver, the material being discharged into a car, as C', (see Fig. 6,) it being evident that as the track T tilts the load-receiver G in the manner hereinbefore described is rolled along the same. When the load is discharged from the load-receiver, it, with the remaining parts of the machine, will be returned to the primary positions, and the operation will be repeated.

Having described my invention, I claim—

1. The combination, with supply means, of weighing mechanism including a load-receiver; a hinged apron sustained by the weighing mechanism and located to receive material from the supply means and to deliver it to the load-receiver; and a link articulated to the apron and to a member of the weighing mechanism.

2. The combination of supplying means; weighing mechanism embodying a load-receiver and a tilting support therefor; an apron located to receive material from the supplying means and to deliver it to the load-receiver; and a rod pivotally connected, respectively, with the apron and support.

3. The combination of supplying means; weighing mechanism embodying a load-receiver; an apron located to receive material from the supplying means and to deliver it to the load-receiver; and a link connected, respectively, with the apron and the load-receiver.

4. The combination of supplying means; weighing mechanism embodying a load-receiver; a counterweighted track upon which the load-receiver is supported for tilting movement, said track being also mounted for oscillation upon beam mechanism; an apron located to receive material from the supplying means and delivering it to the load-receiver, and connected with the load-receiver; means for controlling the supply; a detent normally adapted to hold the counterweighted track against operation; and means for effecting the release of the track.

5. The combination of supplying means; weighing mechanism embodying a load-receiver and its support; an apron located to receive material from the supplying means and to deliver it to the load-receiver; a link connected, respectively, with the apron and the framework; and a rod mounted on the support and connected with the apron.

6. The combination of supplying means; weighing mechanism embodying a load-receiver; a tilting track upon which the load-receiver is mounted; a platform having bearings for the tilting track; a detent normally adapted to hold the track against operation; a connection between the load-receiver and the platform; and means operative with the weighing mechanism for tripping said detent.

7. The combination of a tilting track; a load-receiver supported for movement upon the track; and counterpoising means for the load-receiver.

8. The combination of a tilting track; a load-receiver supported for movement directly upon the track; and a series of beams upon which said platform is mounted.

9. The combination of a tilting track; a load-receiver supported for movement upon the track, the track-engaging portion of the load-receiver being curvilinear; and weighing mechanism.

10. The combination of a tilting track; a load-receiver supported for movement directly upon the track; and beam mechanism.

11. The combination of a track; a load-receiver supported for movement directly upon the track; balance-weights connected with the track; and beam mechanism.

12. The combination of a track consisting of two sections connected by a bar and having oppositely-disposed arms provided with weights; a load-receiver supported for rolling movement upon the track-sections, the track-engaging portion of the load-receiver being curvilinear; and beam mechanism.

13. The combination of a track; a load-receiver supported for movement directly upon the track; beam mechanism; a platform supported by the beam mechanism; and a connection between the platform and the load-receiver.

14. The combination, with a track, of a load-receiver supported for movement upon the track; beam mechanism; a platform mounted on the beam mechanism; and a rod pivoted, respectively, to the platform and load-receiver.

15. The combination of a track; a load-receiver supported for movement upon the track; beam mechanism for the load-receiver; a platform sustained by the beam mechanism and having posts between which the track is supported; a connection between the load-receiver and the platform; and means for normally holding the track against movement.

16. The combination, with a load-receiver and a tilting support upon which the same is mounted, of a platform; a device connecting the platform and support; and means including a latch for normally holding the support against action.

17. The combination of a load-receiver; a tilting support upon which the load-receiver is mounted; a platform; a toggle connected, respectively, with the platform and the support; and means for operating the toggle.

18. The combination of a load-receiver; a tilting support upon which the load-receiver is mounted; beam mechanism; a platform sustained by the beam mechanism; a toggle connected, respectively, with the platform and the support; an arm connected with the toggle; and a latch for engaging said arm.

19. The combination of a load-receiver; a movably-mounted support upon which the load-receiver is supported; a platform; beam mechanism; a toggle connected, respectively, with the platform and support; an arm carried by the platform; and a link connected, respectively, with the arm and toggle.

20. The combination of a load-receiver; a movably-mounted support upon which the load-receiver is carried; a platform; beam mechanism; posts on the platform between which the support is disposed; a latch on one of the posts; an arm on the platform, engaged by the latch; connections between the arm and the support; and a tripper for the latch.

21. The combination of a load-receiver; a movably-mounted support upon which the load-receiver is carried; a platform; beam mechanism; an arm on the platform, furnished with a weight; a toggle connected, respectively, with the support and the platform; a link joining said arm and toggle; and a latch.

22. The combination of a load-receiver; a movably-mounted track upon which the load-receiver is supported for rolling movement, the track-engaging portion of the load-receiver being curvilinear; beam mechanism; a platform mounted upon the beam mechanism; and a connection between the platform and the load-receiver.

23. The combination of weighing mechanism embodying a load-receiver; a supply-conveyer; driving mechanism for the supply-conveyer, comprehending a belt; a pressure device normally acting against the belt to tighten the same; an arm carrying the pressure device and pivotally supported; a second arm fixed to the supporting-pivot; a shaft having an arm connected with the last-mentioned arm; actuating means; a detent normally adapted to hold the actuating means ineffective; and means operative with the weighing mechanism for tripping said detent.

24. The combination of weighing mechanism embodying a load-receiver; a supply-conveyer; driving mechanism for the supply-conveyer, comprehending a belt; a pressure device normally acting against the belt to tighten the same; actuating means for the pressure device, for moving it away from the belt to loosen the same; a detent normally adapted to hold the actuating means ineffective; and means operative with the weighing mechanism for tripping said detent.

25. The combination of weighing mechanism embodying a load-receiver; a supply-conveyer; driving mechanism for the supply-conveyer, comprehending a belt; a pressure device normally acting against the belt to tighten the same; actuating means for moving the pressure device away from the belt to loosen the same; a detent normally adapted to hold the actuating means ineffective; and means operative with the weighing mechanism for tripping the detent.

26. The combination of weighing mechanism embodying a load-receiver and a scale-beam; a supply-conveyer; driving mechanism for the supply-conveyer, comprehending a belt; a pressure device normally acting against the belt to tighten the same; actuating means for holding the pressure device away from the belt; a detent normally adapted to hold the actuating means ineffective; and tripping means for the detent, connected with the scale-beam.

27. The combination of weighing mechanism embodying a load-receiver; a supply-conveyer; driving mechanism for the supply-conveyer, comprehending a belt; a pressure device normally acting against the belt to tighten the same; actuating means for moving the pressure device away from the belt; a detent normally adapted to hold the actuating means ineffective; a detent-tripping link having a loop; and a pin passing through the loop.

28. The combination of weighing mechanism embodying a load-receiver; a supply-conveyer; driving mechanism for the supply-conveyer, comprehending a belt; a pressure device normally acting against the belt to tighten the same; a shaft having an arm connected with the pressure device; a second arm on the shaft, furnished with a weight and having a projection; a detent for engaging said projection; and means operative with the weighing mechanism for tripping the detent.

29. The combination of a load-receiver; a plurality of beams; a rod connecting the beams and having a shoulder, and a stop cooperating with the shoulder and with the load-receiver.

30. The combination of a load-receiver; a tilting support upon which the same is mounted; a plurality of beams; a rod connecting the beams and having a shoulder; and a stop cooperating with the shoulder and connected with the tilting support.

FRANCIS H. RICHARDS.

Witnesses:
F. N. CHASE,
ANDREW FERGUSON.